(12) United States Patent
Ogawa

(10) Patent No.: US 6,546,383 B1
(45) Date of Patent: Apr. 8, 2003

(54) METHOD AND DEVICE FOR DOCUMENT RETRIEVAL

(75) Inventor: Yasushi Ogawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 196 days.

(21) Appl. No.: 09/590,367

(22) Filed: Jun. 9, 2000

(30) Foreign Application Priority Data

Jun. 9, 1999 (JP) .......................................... 11-162068
Dec. 20, 1999 (JP) .......................................... 11-360369

(51) Int. Cl.[7] ............................................. G06F 17/30
(52) U.S. Cl. ............................................. 707/2; 707/5
(58) Field of Search .................................. 707/2, 5

(56) References Cited

U.S. PATENT DOCUMENTS

| | | | | |
|---|---|---|---|---|
| 5,029,223 A | * | 7/1991 | Fujisaki ..................... | 382/187 |
| 5,062,143 A | * | 10/1991 | Schmitt ..................... | 382/228 |
| 5,246,405 A | * | 9/1993 | Nagano ..................... | 474/140 |
| 5,369,605 A | * | 11/1994 | Parks ..................... | 340/146.2 |
| 5,371,807 A | * | 12/1994 | Register et al. ............. | 382/159 |
| 5,418,951 A | * | 5/1995 | Damashek .................... | 707/5 |
| 5,463,773 A | * | 10/1995 | Sakakibara et al. ......... | 382/226 |
| 5,526,443 A | * | 6/1996 | Nakayama ................... | 382/173 |
| 5,548,507 A | * | 8/1996 | Martino et al. ............. | 704/1 |
| 5,706,365 A | * | 1/1998 | Rangarajan et al. ........ | 707/102 |
| 5,717,914 A | * | 2/1998 | Husick et al. .............. | 345/440 |
| 5,724,593 A | * | 3/1998 | Hargrave et al. ............ | 704/7 |
| 5,752,051 A | * | 5/1998 | Cohen ........................ | 704/1 |
| 5,845,049 A | * | 12/1998 | Wu ........................... | 706/16 |
| 5,862,259 A | * | 1/1999 | Bokser et al. ............... | 382/156 |
| 5,991,714 A | * | 11/1999 | Shaner ....................... | 704/1 |
| 6,006,221 A | * | 12/1999 | Liddy et al. ................ | 704/2 |
| 6,029,195 A | * | 2/2000 | Herz .......................... | 725/116 |
| 6,035,268 A | * | 3/2000 | Carcus et al. ............... | 704/9 |
| 6,075,470 A | * | 6/2000 | Little et al. ................ | 341/106 |
| 6,272,456 B1 | * | 8/2001 | de Campos .................. | 704/8 |
| 6,292,772 B1 | * | 9/2001 | Kantowitz ................... | 382/230 |
| 6,360,010 B1 | * | 3/2002 | Hu et al. .................... | 358/464 |

OTHER PUBLICATIONS

Syun–ichi Fukushima, et al., "Development and Evaluation of Full–Document–Based Retrieval System 'Retrieval Express'," Proceedings of the Third Annual Meeting of the Association for Natural Language Processing, Mar. 27–28, 1997, pp. 361–364.

Chuichi Kikuchi, "A Fast Full–Text Search Method for Japanese Text Database," The Transactions of the Institute Electronics, Information and Communication Engineers, vol. J75–D–I, No. 9, Sep. 25, 1992, pp. 836–846.

Donna Harman, "Ranking Algorithms (Chapter 14)," Information Retrieval: Data Structures and Algorithms, Prentice Hall, 1992, pp. 363–392.

Syun–ichi Fukushima, et al., "Development and evaluation of full–document–based retrieval system [Retrieval Express], " Proceedings of the Third Annual Meeting of the Association for Natural Language Processing, Mar. 27–28, 1997, pp. 361–364.

Chuichi Kikuchi, "A Fast Full–Text Search Method For Japanese Text Database," The Transactions of the Institute of Electronics, Information and Communication Engineers, vol. J75–D–I, No. 9, Sep. 25, 1992, pp. 836–846.

Donna Harman, "Ranking Algorithms (Chapter 14)," Information Retrieval: Data Structures and Agorithms, Prentice Hall, 1992, pp. 362–392.

* cited by examiner

*Primary Examiner*—Wayne Amsbury
(74) *Attorney, Agent, or Firm*—Oblon, Spivak, McClelland, Maier & Neustadt, P.C.

(57) ABSTRACT

A method for document retrieval includes the steps of dividing a query character string into partial character strings, selecting one or more documents from a plurality of registered documents such that the one or more documents each include all the partial character strings, computing respective scores of the partial character strings for each of the one or more documents, and computing a score of the query character string from the respective scores of the partial character strings for each of the one or more documents.

36 Claims, 14 Drawing Sheets

FIG. 2A

DOCUMENT 1

```
-----
11 ABCD    -----
20 EF      -----
31 ABCDEF  -----
60 EF      -----
```

FIG. 2B

DOCUMENT 2

```
 1  GDEF
24  EF
30  AB
42  AB
```

DOCUMENT 1

TKYBYKT。

FIG. 11B

DOCUMENT 2

SNMWYIT。

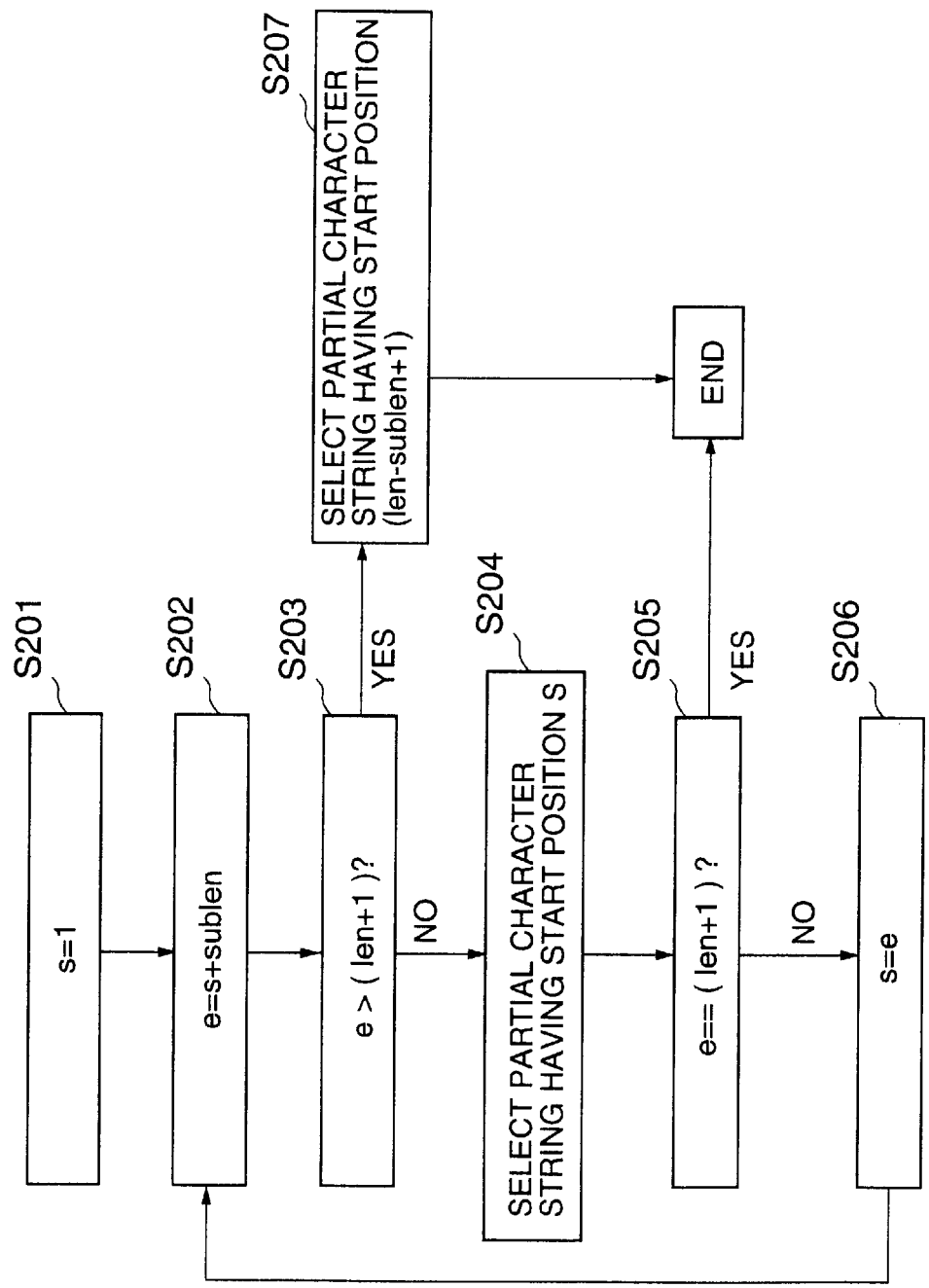

METHOD AND DEVICE FOR DOCUMENT RETRIEVAL

BACKGROUND OF THE INVENTION

1. Field of the Invention

The present invention generally relates to a device, a method, and a memory medium having a program embodied therein for document retrieval.

2. Description of the Related Art

Document-retrieval techniques retrieve documents including a query character string from a document database. One of such document-retrieval techniques is a likely-relevance retrieval scheme, which retrieves documents that include character strings resembling a query character string.

The likely-relevance retrieval technique is disclosed, for example, in the Japanese Patent Laid-open Application No. 11-85776. This technique calculates ranking scores of partial character strings that are part of a query character string based on the frequency of occurrences, and searches for the query character string in the document by using the obtained ranking scores.

Another example of the likely-relevance retrieval technique is found in "Development and Evaluation of Full-Document-Based Retrieval System 'Retrieval Express'," Proceedings of the Third Annual Meeting of the Association for Natural Language Processing, pp. 361–364, March, 1997. This technique obtains frequency of occurrences of a query character string in a document by obtaining all positions of such occurrences in the document based on occurrences of partial character strings, and calculates a ranking score of the query character string in respect of the document.

The technique disclosed in the above patent laid-open application, however, merely searches for a query character string in a single document, and cannot be used to retrieve a document including a query character string from a plurality of documents.

Further, the longer the query character string, the larger the number of partial character strings that are to be taken into account in the search. Also, the longer the query character string, the larger the number of document segments that are to be processed for calculation of ranking scores. This results in an increase in retrieval time. For example, when a query character string is "ABCDEF" (each capital letter represents a single Japanese character for the sake of explanation), and partial character strings each comprised of 2 characters are used as a unit of processing, one can extract five partial character strings, i.e., "AB", "BC", "CD", "DE", and "EF". In general, when a query character string is comprised of m characters, and n characters constitute a unit of processing, one can extract (m−n+1) partial character strings. Since the ranking score needs to be calculated at every position where at least one of extracted partial character strings appears, the number of positions that require computation increases as the number of partial character strings increases.

A ranking score of a partial character string in the document is calculated based on frequency of occurrences of the partial character string in the document. Some of the partial character strings appearing in the document may have no bearing on the query character string, yet such occurrences are counted toward the ranking scores. This reduces accuracy of the search. For example, the query character string "ABCDEF" may appear only once in a given document, and another character string "WXYZEF" that has a totally different meaning may appear many times in this document. In such a case, the partial character string "EF" appears as many times as the number of occurrences of "ABCDEF" plus the number of occurrences of "WXYZEF". As a result, the ranking score of the partial character string "EF" ends up being inappropriately high despite the rare occurrence of the query character string, resulting in an inappropriately high ranking score for the query character string.

Another problem is that search cannot be conducted if the length of a query character string is shorter than a unit of processing. This is because the query character string cannot be divided into partial character strings having the length of the unit of processing. For example, if the query character string is "B", and two characters constitute a unit of processing, the search of this method cannot be performed since the query character string is shorter than the unit of processing.

The technique disclosed in "Development and Evaluation of Full-Document-Based Retrieval System 'Retrieval Express'," Proceedings of the Third Annual Meeting of the Association for Natural Language Processing, pp. 361–364, March, 1997 has the same problem as the technique disclosed in the above patent laid-open application. That is, the amount of computation for counting occurrences of a query character string in a document increases as the length of the query character string increases, resulting in lengthening of a processing time for document retrieval. The larger the number of occurrences of a query character string, the more conspicuous the increase in the processing time for document retrieval.

Accordingly, there is a need for a retrieval scheme that can retrieve a document easily at high speed.

There is another need for a retrieval scheme in which the computation load of selecting a document and calculating ranking scores can be reduced, thereby achieving high-speed processing.

There is another need for a retrieval scheme that is free from an influence of other character strings having no relevance to a query character string, thereby improving retrieval accuracy.

There is another need for a retrieval scheme in which the computation load of obtaining positions of occurrences of a query character string can be reduced, thereby achieving high-speed document retrieval.

There is another need for a retrieval scheme in which the number of score searches can be reduced, thereby boosting a search speed.

There is another need for a retrieval scheme that can retrieve a document even if the length of a query character string is shorter than a unit of processing.

There is another need for a retrieval scheme in which the computation load of calculating ranking scores is reduced, thereby achieving high-speed retrieval.

SUMMARY OF THE INVENTION

It is a general object of the present invention to provide a document-retrieval scheme that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a method and a device for document retrieval particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a method for document retrieval comprising the steps of dividing a query character string into partial character strings, selecting one or more documents from a plurality of registered documents such that the one or more documents each include all the partial character strings, computing respective scores of the partial character strings for each of the one or more documents, and computing a score of the query character string from the respective scores of the partial character strings for each of the one or more documents.

In the method described above, the one or more documents that include the partial character strings resembling the query character string are selected prior to the computation of scores. Because of this screening process, the high-speed document retrieval can be achieved to retrieve a document from the plurality of registered documents.

According to one aspect of the present invention, the method as described above is such that the step of dividing divides the query character string into the partial character strings that generally do not overlap and that cover a full length of the query character string.

In the method described above, the computation load of selecting the one or more documents and computing scores can be reduced, thereby attaining high-speed document retrieval.

According to another aspect of the present invention, the method described first in the above is such that the step of computing respective scores of the partial character strings includes the steps of obtaining a first count indicating how many of the registered documents include a given one of the partial character strings, obtaining second counts each indicating how many times a corresponding one of the partial character strings appears in a given one of the one or more documents, obtaining the smallest of the second counts, and obtaining a score of the given one of the partial character strings for the given one of the one or more documents from the first count and the smallest of the second counts such that the score of the given one of the partial character strings increases as the first count decreases and as the smallest of the second counts increases.

In the method described above, influence of irrelevant occurrences of the partial character strings can be reduced when computing scores, thereby improving retrieval accuracy.

According to another aspect of the preset invention, the method described first in the above is such that the step of computing respective scores of the partial character strings includes the steps of obtaining a first count indicating how many of the registered documents include a given one of the partial character strings, obtaining a second count indicating how many times the query character string appears in a given one of the one or more documents, and obtaining a score of the given one of the partial character strings for the given one of the one or more documents from the first count and the second count such that the score of the given one of the partial character strings increases as the first count decreases and as the second count increases.

In the method described above, influence of irrelevant occurrences of the partial character strings within a document can be eliminated when computing scores, thereby improving retrieval accuracy.

According to another aspect of the present invention, the method described above is such that the step of obtaining a second count further includes a step of placing an upper limit on the second count.

In the method described above, the computation load of detecting positions of the query character string can be reduced, thereby helping to achieve high-speed document retrieval.

According to another aspect of the present invention, the method described first in the above is such that the step of selecting one or more documents selects the one or more documents each of which includes the query character string, and the step of computing respective scores of the partial character strings includes the steps of obtaining a first count indicating how many of the registered documents include the query character string, obtaining a second count indicating how many times a given one of the partial character strings appears in a given one of the one or more documents, and obtaining a score of the given one of the partial character strings for the given one of the one or more documents from the first count and the second count such that the score of the given one of the partial character strings increases as the first count decreases and as the second count increases.

In the method described above, influence of irrelevant occurrences of the partial character strings across different documents can be eliminated, thereby contributing to improved accuracy of document retrieval.

According to another aspect of the present invention, the method described first in the above is such that the step of selecting one or more documents selects the one or more documents each of which includes the query character string, and the step of computing respective scores of the partial character strings includes the steps of obtaining a first count indicating how many of the registered documents include the query character string, computing a limit from the first count, obtaining a second count indicating how many times the query character string appears in a given one of the one or more documents while limiting an upper end of the second count to the limit, and obtaining a score of a given one of the partial character strings for the given one of the one or more documents from the first count and the second count such that the score of the given one of the partial character strings increases as the first count decreases and as the second count increases.

In the method described above, influence of irrelevant occurrences of the partial character strings can be eliminated, and the computation load of detecting positions of the query character string can be reduced, thereby contributing to achieve accurate and high-speed document retrieval.

According to another aspect of the present invention, a method for document retrieval includes the steps of providing respective indexes for documents, each of the respective indexes listing partial character strings found in a corresponding document and respective positions thereof in the corresponding document, selecting the partial character strings which start with a character string identical to a query character string, selecting one or more documents from the documents such that the one or more documents each include at least one of the selected partial character strings, computing respective scores of the selected partial character strings for each of the one or more documents, and computing a score of the query character string from the respective scores of the selected partial character strings for each of the one or more documents.

In the method described above, appropriate document retrieval can be attended to even when the query character string is shorter than a length of the partial character strings.

BRIEF DESCRIPTION OF THE DRAWINGS

FIGS. 2A–2C are illustrative drawings showing registered documents;

FIGS. 11A through 11C are illustrative drawings showing examples of documents and an example of a corresponding index unit;

FIG. 14 is a flowchart of a process of selecting partial character strings that do not overlap and cover a full length of a query character string.

DESCRIPTION OF THE PREFERRED EMBODIMENTS

In the following, embodiments of the present invention will be described with reference to the accompanying drawings.

Figure 1:
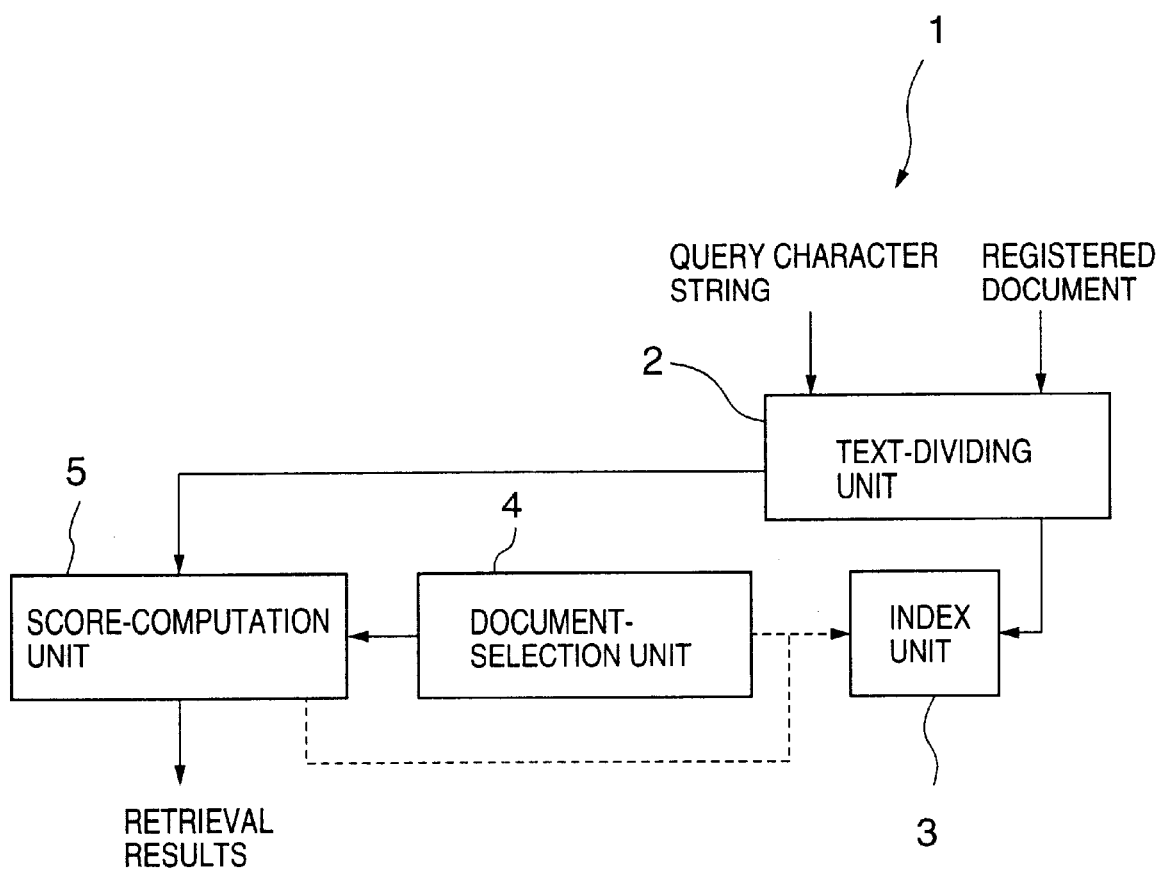
FIG. 1 is a block diagram of a document-retrieval device according to the first embodiment of the present invention.

FIG. 1 is a block diagram of a document-retrieval device 1 according to a first embodiment of the present invention. The document-retrieval device 1 includes a text-dividing unit 2, an index unit 3, a document-selection unit 4, and a score-computation unit 5.

The text-dividing unit 2 divides a text into partial character strings where the text may be a registered document or may be a query character string. The index unit 3 stores therein information about partial character strings that are obtained by dividing a registered document. The document-selection unit 4 uses partial character strings obtained by dividing a query character string to select a document for which a ranking score is to be calculated. The score-computation unit 5 uses the partial character strings obtained by dividing the query character string to compute a ranking score of the document selected by the document-selection unit 4. The text-dividing unit 2 performs a dividing step, and the document-selection unit 4 carries out a document-selection step. Further, the score-computation unit 5 performs a score-computation step. Details of each step will be described later.

When a document to be registered is provided, the text-dividing unit 2 divides the document into partial character strings. Information about occurrences of the partial character strings is stored in the index unit 3.

In the following, a process performed by the document-retrieval device 1 will be described in detail.

FIGS. 2A and 2B are illustrative drawings showing registered documents. Each of FIGS. 2A and 2B shows a registered document. In each registered document, numbers shown on the left indicate the number of characters counted from the beginning of a document to a position of corresponding character strings. In a document of FIG. 2A, the character string "ABCD" starts at the eleventh character from the beginning of the document, and "EF" is found at the twentieth character and at the sixtieth character from the beginning. Further, the character string "ABCDEF" appears at the thirty first character from the beginning. When a two-character character string is used as a unit of processing, all two-character character strings are extracted from a document, and the extracted character strings are recorded in the index unit 3 together with their positions of appearance (character count from the beginning of the document).

FIG. 2C is an illustrative drawing showing the contents of the index unit 3. For example, the document shown in FIG. 2A has the character string "AB" appearing at the $11^{th}$ character and at the $31^{st}$ character from the beginning, and has the character string "BC" starting at the $12^{th}$ character and at the $32^{nd}$ character from the beginning, so that these occurrences in the document are recorded in the index unit 3 as shown in FIG. 2C. The index unit 3 not only records the positions of occurrences, but also records document identifiers for identifying documents relevant to the recorded occurrences. Further, the numbers of occurrences are also recorded. As shown in FIG. 2C, the character string "AB" is recorded as "{1, 2, (11, 31)}", which indicates that the character string "AB" appears twice (the number of occurrences=2) in the document of FIG. 2A having the document identifier 1, and these occurrences are found at the $11^{th}$ character and at the $31^{st}$ character from the beginning.

When a query character string is provided for the purpose of document retrieval, the text-dividing unit 2 divides the query character string into partial character strings. The document-selection unit 4 selects a document or documents for which a ranking score is to be computed where such selection is made in view of the partial character strings. The score-computation unit 5 computes a ranking score for each of the selected documents by using the partial character strings, thereby providing document-retrieval results.

The document-selection unit 4 selects one or more documents by identifying the documents that include all the partial character strings of the query character string. Alternatively, documents that include the query character string itself may be selected, or documents that satisfy certain appropriate conditions may be selected.

The score-computation unit 5 computes a ranking score of the query character string with respect to each of the selected documents. The ranking score of the query character string is obtained based on ranking scores of the partial character strings. Here, the ranking scores of the partial character strings may be computed by using a method known in the art such as a tf method, a tf.idf method, or the like that are typically used in data retrieval. For example, reference may be made to W. B. Frakes Ed., "information Retrieval Data Structures & Algorithms," Prentice Hall, 1992, and, in particular, the Section 14 of the document. In order to obtain a ranking score of the query character string from the ranking scores of the partial character strings, one may obtain a sum, an average, a maximum, etc., of the ranking scores of the partial character strings.

The computation of ranking scores will be described with reference to the index unit 3 shown in FIG. 2C.

When a query character string "ABCDEF" is provided, the text-dividing unit 2 extracts partial character strings "AB", "BC", "CD", "DE", and "EF". Then, the document-selection unit 4 selects a document or documents that includes all of the partial character strings from a plurality of registered documents. In this example, only the document of FIG. 2A satisfies the required condition. In the prior art, documents that include at least one of the partial character strings are selected. Such a prior-art scheme would select also the document of FIG. 2B in this example, whereas the present invention chose not to select the document of FIG. 2B.

After the selection of a document or documents, the score-computation unit 5 computes a ranking score with respect to each of the selected documents by using the partial character strings. Hereinafter, the ranking scores of the partial character strings are referred to as being computed as:

$$SCORE(n) = tf(n) * (1 + \text{Log}_2(N/df(n))) \quad (1)$$

where SCORE(n) is a ranking score of the partial character string n, and tf(n) is the number of occurrences of the partial character string n in the relevant document. Further, N indicates the number of registered documents (which is two in this example), and df(n) indicates the number of registered documents that include the partial character string n. Hereinafter, df(n) is referred to as document frequency. In this embodiment, the ranking score for the document is obtained as a sum of the ranking scores of the partial character strings included in the document. With respect to the document of FIG. 2A, the ranking score SCORE(AB) of the partial character string "AB" is obtained by substituting 2 for tf(AB) and 2 for df(AB) in the equation (1). In this case, SCORE(AB) is 2. By the same token, SCORE(BC)=4, SCORE(CD)=4, SCORE(DE)=1, and SCORE(EF)=3 will be obtained.

Accordingly, SCORE(ABCDEF) is obtained as:

$$SCORE(ABCDEF) = SCORE(AB) + SCORE(BC) + SCORE(CD) + SCORE(DE) + SCORE(EF) = 14$$

This is the ranking score of the query character string "ABCDEF" in respect of the document of FIG. 2A.

Figure 3:
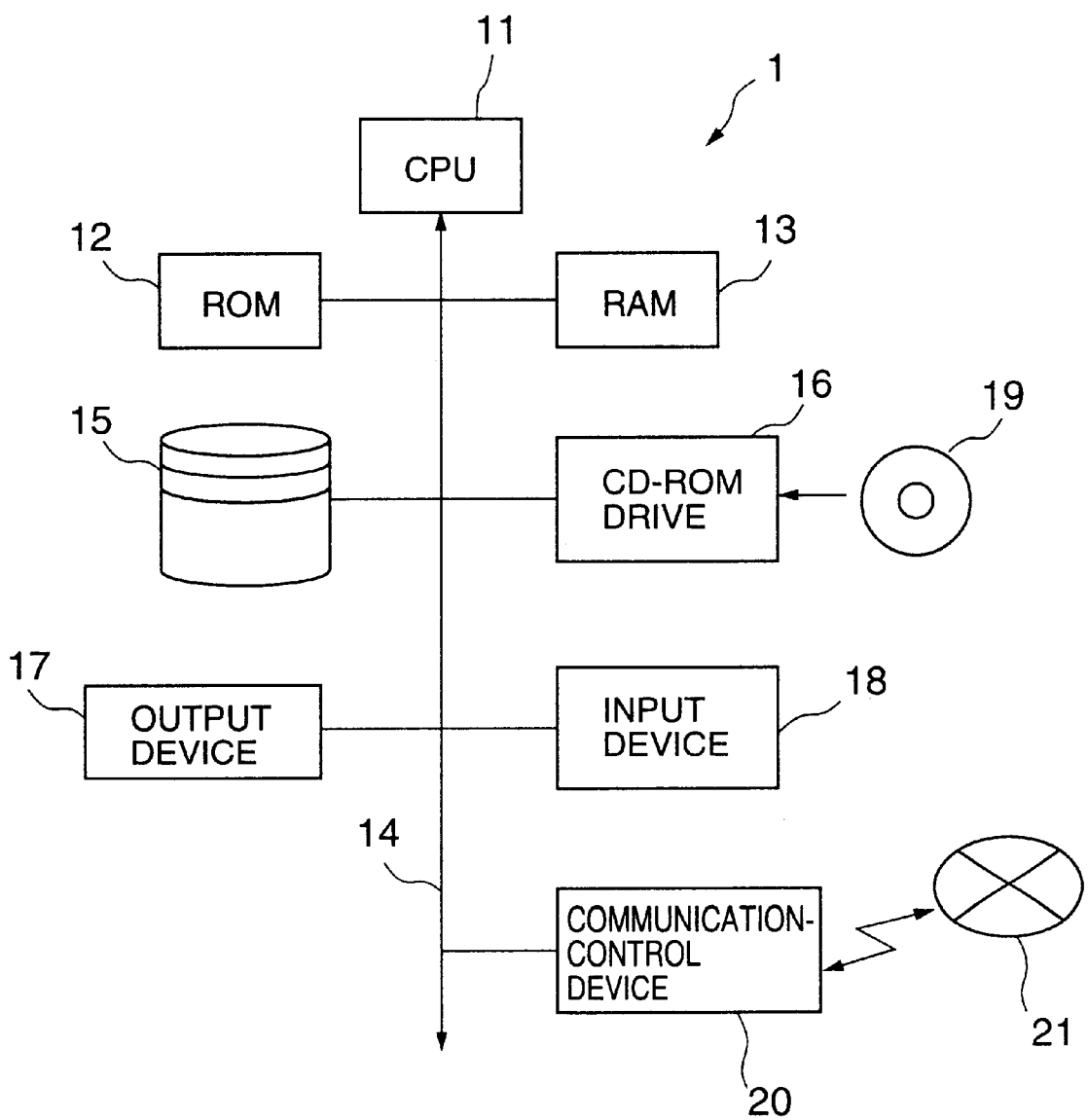
FIG. 3 is a block diagram of a system configuration that implements the document-retrieval device of FIG. 1.

FIG. 3 is a block diagram of a system configuration that implements the document-retrieval device 1.

The document-retrieval device 1 includes a CPU 11, a ROM 12, a RAM 13, a bus 14, a hard drive 15, a CD-ROM drive 16, an output device 17, an input device 18, and a communication-control device 20. The CPU 11 attends to various executions and central control of various elements. The ROM 12 is a read-only memory storing therein BIOS programs and the like. The RAM 13 stores therein data, and provides a work area for the CPU 11. The bus 14 connects between the CPU 11, the ROM 12, and the RAM 13. The bus 14 is also connected via interfaces and/or control circuits (not shown) to the hard drive 15, the CD-ROM drive 16, the output device 17 such as a CRT display, a LCD display, or a printer, the input device 18 such as a keyboard and a mouse, and the communication-control device 20, which is connected to a network 21.

Programs for causing the document-retrieval device 1 to perform processing according to the present invention are recorded in a CD-ROM 19 serving as a memory medium of the present invention. The CD-ROM 19 is inserted into the CD-ROM drive 16, and the programs are loaded and installed in the hard drive 15. With the programs stored in the hard drive 15, the document-retrieval device 1 is ready to execute various processes of the present invention. Namely, the various units shown in FIG. 1 are embodied as processes performed by the CPU 11 executing the programs. The index unit 3 is built as a database in the hard drive 15.

The memory medium of the present invention is not limited to a CD-ROM, but may be any types of memory media such as CD-RW, CD-R, DVD, FD, or MO. The program may be downloaded from the network 19 such as the Internet via the communication-control device, and may be installed in the hard drive 15. In this case, a memory device that stores therein the programs on the transmission side of the network 19 is regarded as the memory medium of the present invention. The programs may operate on a predetermined operation system.

Figure 4:
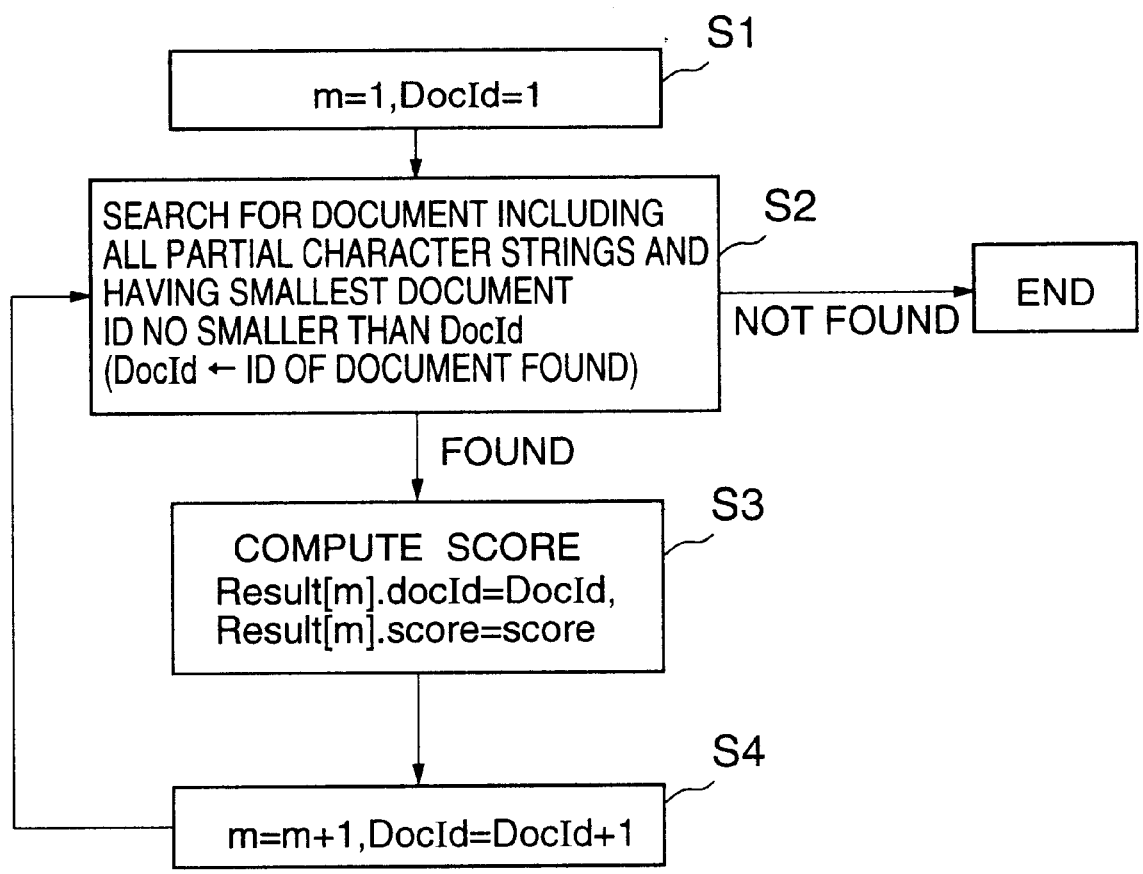
FIG. 4 is a flowchart of a process of computing ranking scores for a plurality of documents where the process is performed by the document-retrieval device according to the first embodiment of the present invention.

FIG. 4 is a flowchart of a process of computing ranking scores for a plurality of documents where the process is performed by the document-retrieval device 1 according to the first embodiment of the present invention. The flowchart of FIG. 4 is shown by using C-language-like notations.

At a step S1, an array index m and a document identifier DocId are both set to 1.

At a step S2, a search is made for a document that includes all the partial character strings and has the smallest document ID no smaller than DocId. If such a document is found, the document identifier DocId is set to the obtained document ID, and the procedure goes to a step S3. Otherwise, the procedure comes to an end.

At the step S3, a ranking score for the document having the document identifier DocId is computed. The obtained score is stored in the C-language-like structure having the document identifier and the score as its members.

At a step S4, the array index m and the document identifier DocId are each incremented by one. Then, the procedure goes back to the step S2.

Figure 5:
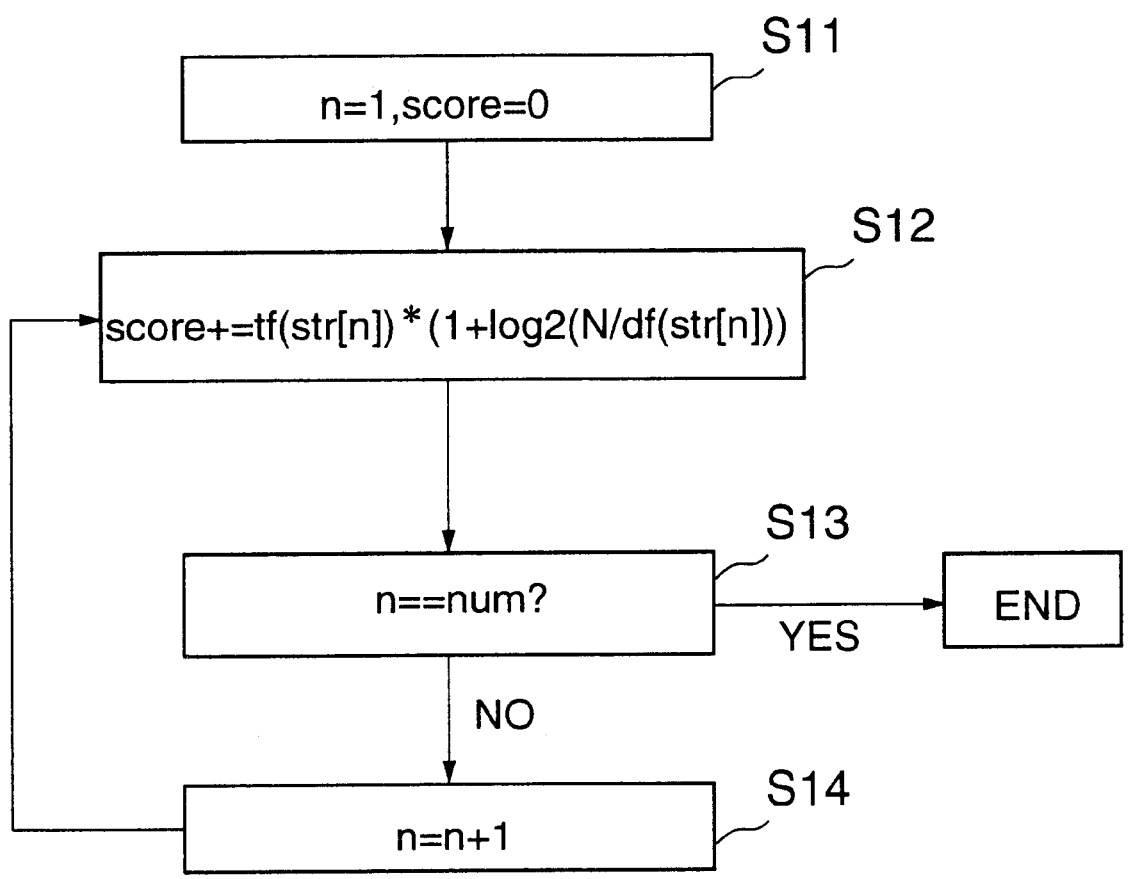
FIG. 5 is a flowchart of a process of computing a ranking score that is performed at a step S3 of FIG. 4.

FIG. 5 is a flowchart of a process of computing a ranking score that is performed at the step S3 of FIG. 4.

At a step S11, a parameter n for indicating a partial character string is get to 1, and a score is set to zero.

At a step S12, the equation (1) is computed with reference to a character string str[n], and is added to the score.

At a step S13, a check is made as to whether n is equal to num. Here, num is the number of all the partial character strings of a query character string. If n is equal to num, the procedure comes to an end. Otherwise, the procedure goes to a step S14.

At the step S14, n is incremented by one. Then, the procedure goes back to the step S12.

In the following, a second embodiment of the present invention will be described.

In the second embodiment, the same elements as those of the first embodiment will be referred to by the same reference numerals, and a description thereof will be omitted.

The document-retrieval device 1 of the second embodiment differs from that of the first embodiment only in the operations of the score-computation unit 5. In the first embodiment, the score-computation unit 5 computes a ranking score of a partial character string with respect to a selected document in view of the number of occurrences of the partial character string in the document. This partial character string may appear in the document in a context that has no semantic relevance to the query character string, and such irrelevant occurrence affects the obtained ranking score, thereby resulting in less accurate search.

In the example of FIG. 2A, the partial character string "EF" appearing at the $20^{th}$ character and at the $60^{th}$ character is likely to have no relevance to the query character string. Since the character string "EF" appears three times in the document, however, SCORE(EF) is simply computed as being 3. In terms of relevancy to the query character string "ABCDEF", this score may be too high.

In the second embodiment, the document-retrieval device 1 selects a minimum occurrence count from a plurality of occurrence counts of respective partial character strings appearing in the document, and substitutes the selected minimum occurrence count for occurrence counts of the partial character strings in computing the ranking scores. In the example of FIG. 2A, a minimum occurrence count is 1 that is the number of occurrences of a partial character string "DE", so that the minimum occurrence count 1 is substituted for occurrence counts of the other partial character strings "AB", "BC", "CD", and "EF" for the purpose of computing the ranking scores. As a result, SCORE(AB)=1, SCORE(BC)=2, SCORE(CD)=2, SCORE(DE)=1, and SCORE(EF)=1 are obtained, producing SCORE(ABCDEF) that is equal to 7.

Figure 6:
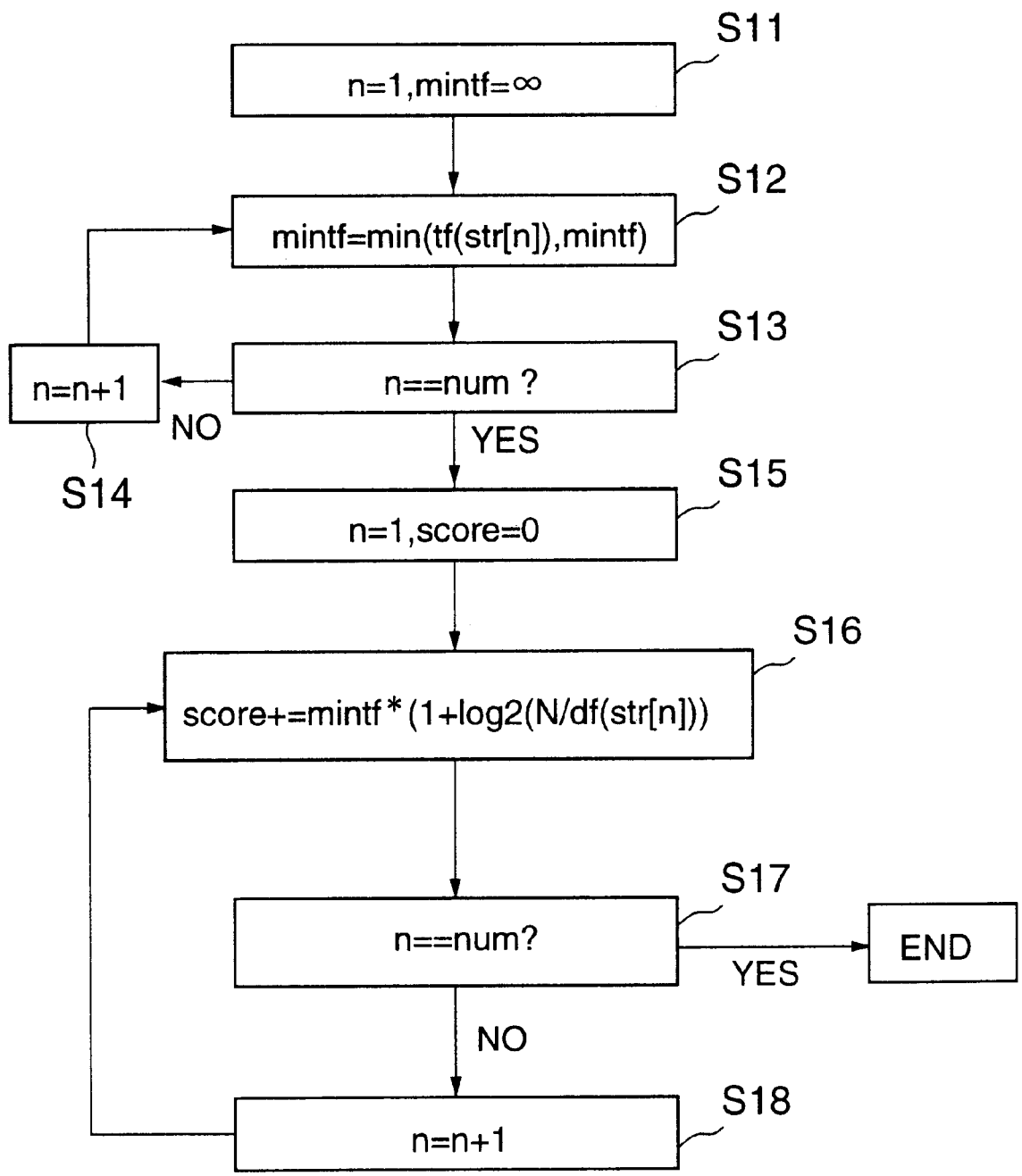
FIG. 6 is a flowchart of a process of computing a ranking score according to the second embodiment of the present invention.

FIG. 6 is a flowchart of a process of computing a ranking score according to the second embodiment of the present invention. Steps other than the step of computing a ranking score are the same as those of the first embodiment as shown in FIG. 4.

At a step S11 of FIG. 6, a parameter n for indicating a partial character string is set to 1, and a parameter mintf for obtaining a minimum occurrence count is set to a number that is substantially large.

At a step S12, mintf is set to the smallest of mintf and an occurrence count of a character string str[n].

At a step S13, a check is made as to whether n is equal to num. As was before, num is the number of all the partial character strings of a query character string. If n is not equal to num, the procedure goes to a step S14, where n is incremented by one, followed by the procedure going back to the step S12. If n is equal to num, then, it means that mintf is equal to the minimum occurrence count, so that the procedure proceeds to a next step.

At a step S15, n is set to 1, and a score is set to 0.

At a step S16, the equation (1) in which tf(n) is replaced by mintf is computed with reference to a character string str[n], and is added to the score.

At a step S17, a check is made as to whether n is equal to num. If n is equal to num, the procedure comes to an end. Otherwise, the procedure goes to a step S18.

At the step S18, n is incremented by one. Then, the procedure goes back to the step S16.

According to the second embodiment, influence of irrelevant occurrences of partial character strings is eliminated from the ranking score of the query character string when such occurrences take place in contexts that have no relevance to the query character string. This improves retrieval accuracy.

In the following, a third embodiment of the present invention will be described.

In the third embodiment, the same elements as those of the second embodiment will be referred to by the same reference numerals, and a description thereof will be omitted.

The document-retrieval device 1 of the third embodiment differs from that of the second embodiment in that the third embodiment employs a different scheme from the second embodiment in eliminating influence of irrelevant occurrences of partial character strings.

In order to eliminate influence of irrelevant occurrences of partial character strings, the number of occurrences of the query character string is obtained with respect to a selected document, and, then, is used as a substitute for occurrence counts of the partial character strings for the purpose of obtaining ranking scores. The occurrence count of the query character string is obtained by checking all the positions where the query character string appears in the selected document.

In order to obtain the positions of appearances of the query character string, a conventional method may be employed, that matches positions of partial character strings together. For example, a technique that is disclosed on page 839 in Chuichi Kikuchi, "A Fast Full-Text Search Method for Japanese Text Database," Transactions of the Institute of Electronics, Information and Communication Engineers, Vol. J75-D-I, No.9, pp. 836–846, 1992 may be used.

With regard to the example of the document of FIG. 2A, it can be ascertained from the index of FIG. 2C that the query character string "ABCDEF" appears only once at the $31^{st}$ character from the beginning. Based on this finding, the occurrence counts of the partial character strings "AB", "BC", "CD", "DE", and "EF" are set to 1, which is the occurrence count of the query character string. The ranking score obtained as a result of this procedure is the same as that of the second embodiment. That is, SCORE(ABCDEF) that is 7 is obtained.

Figure 7:
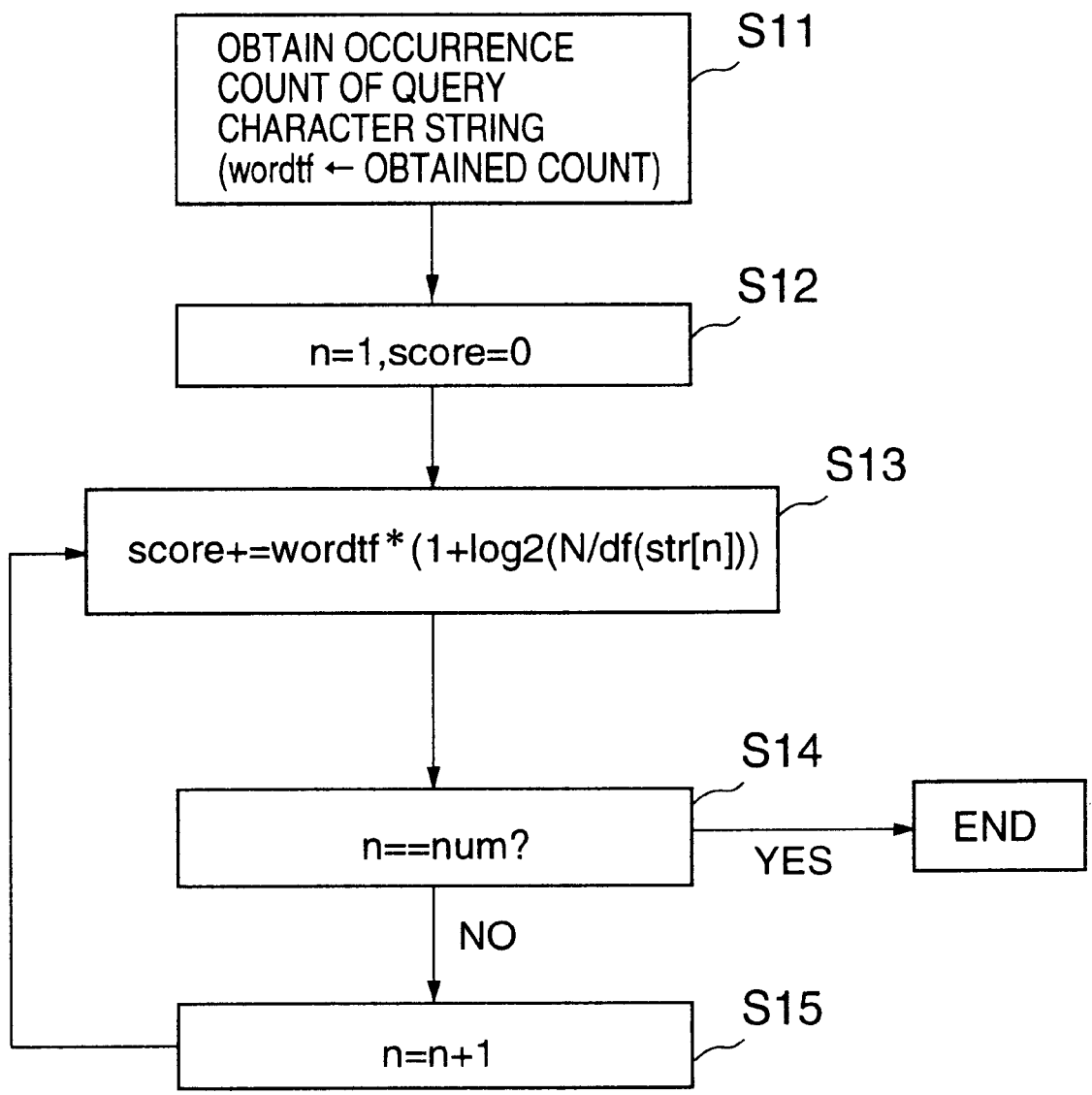
FIG. 7 is a flowchart of a process of computing a ranking score according to the third embodiment of the present invention.

FIG. 7 is a flowchart of a process of computing a ranking score according to the third embodiment of the present invention. Steps other than the step of computing a ranking score are the same as those of the first embodiment as shown in FIG. 4.

At a step S11 of FIG. 7, the number of occurrences of a query character string is obtained. The obtained occurrence count is set to wordtf.

At a step S12, a parameter n for indicating a partial character string is set to 1, and a score is set to 0.

At a step S13, the equation (1) in which tf(n) is replaced by wordtf is computed with reference to a character string str[n], and is added to the score.

At a step S14, a check is made as to whether n is equal to num. If n is equal to num, the procedure comes to an end. Otherwise, the procedure goes to a step S15.

At the step S15, n is incremented by one. Then, the procedure goes back to the step S13.

According to the third embodiment, influence of irrelevant occurrences of partial character strings is eliminated from the ranking score of the query character string when such occurrences take place in contexts that have no relevance to the query character string. This improves retrieval accuracy.

In the following, a fourth embodiment of the present invention will be described.

In the fourth embodiment, the same elements as those of the third embodiment will be referred to by the same reference numerals, and a description thereof will be omitted.

The document-retrieval device 1 of the fourth embodiment differs from that of the third embodiment in the following aspects. In the third embodiment, the score-computation unit 5 obtains the occurrence count of a query character string in a selected document by checking all the positions where the query character string appears in the document.

When the query character string is long and appears many times, however, the computation load of obtaining all the occurrence positions is prohibitively large, resulting in a lengthy retrieval time for retrieving a document.

In the fourth embodiment of the present invention, an upper limit is placed on the occurrence count of a query character string. If the occurrence count of a query character string in a document is below the upper limit, this count is used as the number of occurrences of the query character string. If the occurrence count of a query character string exceeds the upper limit, the upper limit is used as a substitute for the occurrence count. In this case, there is no need to go all the way to checking all the appearance positions of the query character string, and it suffices if counting is stopped when the count reaches the upper limit.

Figure 8:
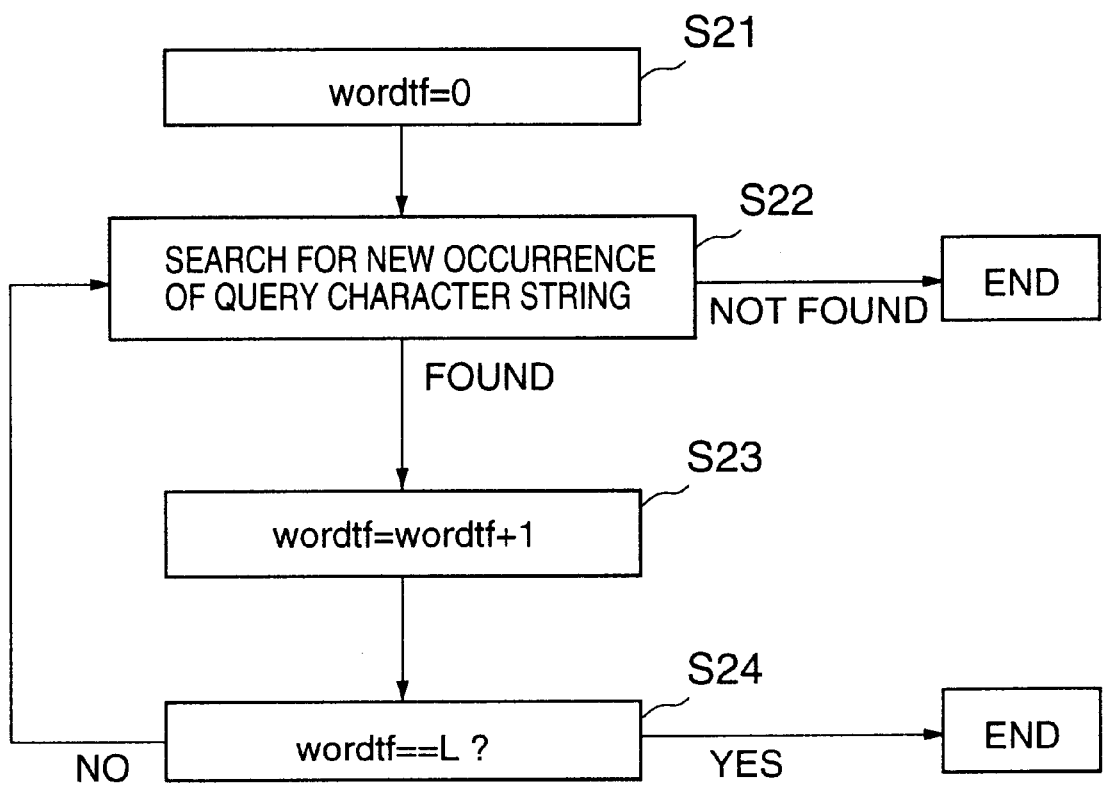
FIG. 8 is a flowchart of a process of obtaining an occurrence count of a query character string having an upper limit according to the fourth embodiment of the present invention.

FIG. 8 is a flowchart of a process of obtaining the occurrence count of a query character string having an upper limit according to the fourth embodiment of the present invention.

In the third embodiment, the occurrence count of a query character string is obtained simply by counting all the occurrences of the query character string at the step S11 of FIG. 7. In the fourth embodiment, the occurrence count is obtained as follows.

At a step S21, wordtf is set to 0.

At a step S22, a new occurrence of the query character string is searched for. If it is found, the procedure goes to a step S23. Otherwise, the procedure comes to an end.

At the step S23, the occurrence count wordtf is incremented by one.

At a step S24, a check is made as to whether wordtf is equal to L where the number L defines an upper limit of the occurrence count. If it is, the procedure comes to an end. Otherwise, the procedure goes back to the step S22.

According to the fourth embodiment of the present invention, the computation load of checking all the appearance positions of a query character string is reduced compared to the case of the third embodiment, thereby achieving faster document retrieval.

In the following, a fifth embodiment of the present invention will be described.

In the fifth embodiment, the same elements as those of the third embodiment will be referred to by the same reference numerals, and a description thereof will be omitted.

The document-retrieval device 1 of the fifth embodiment differs from that of the third embodiment in the following aspects. In the third embodiment, the score-computation unit 5 obtains an occurrence count of a query character string in a selected document, and uses the obtained occurrence count as a substitute for occurrence counts of partial character strings to obtain ranking scores. In this manner, influence of irrelevant occurrences of partial character strings can be eliminated from the ranking score of the query character string when the partial character strings appear out of context from the query character string.

In the third embodiment, the ranking score of a query character string is derived from the ranking scores of partial character strings, which are in turn derived based on the number of registered documents that include the partial character strings. As a result, presence of an irrelevant document may affect the ranking score where the irrelevant document includes a particular partial character string without including a query character string. In other words, influence of irrelevant occurrence of partial character strings is not completely eliminated in the third embodiment.

In the example of the document of FIG. 2A, SCORE(AB) is calculated as being equal to 1 since the number of documents that include the character string "AB" is two where the occurrence count of the character string "AB" in the document of FIG. 2A is set to the number of occurrences of the query character string. The document of FIG. 2B, however, is irrelevant since this document does not include the query character string "ABCDEF". In this case, therefore, presence of an irrelevant document, which is another type of irrelevant occurrence of partial character strings, is affecting the ranking score of the query character string.

In consideration of this, the fifth embodiment of the present invention uses the number of documents having a query character string therein as the number of documents that include a given partial character string, for the purpose of computing a ranking score of the given partial character string. In the example of the document of FIGS. 2A and 2B, the number of registered documents that include the character string "AB" is set equal to 1, which is the number of documents that include the query character string "ABCDEF". As a result, SCORE(AB) becomes 2. By the same token, SCORE(BC)=2, SCORE(CD)=2, SCORE(DE)=2, and SCORE(EF)=2 are obtained, making SCORE (ABCDEF) equal to 10.

Figure 9:
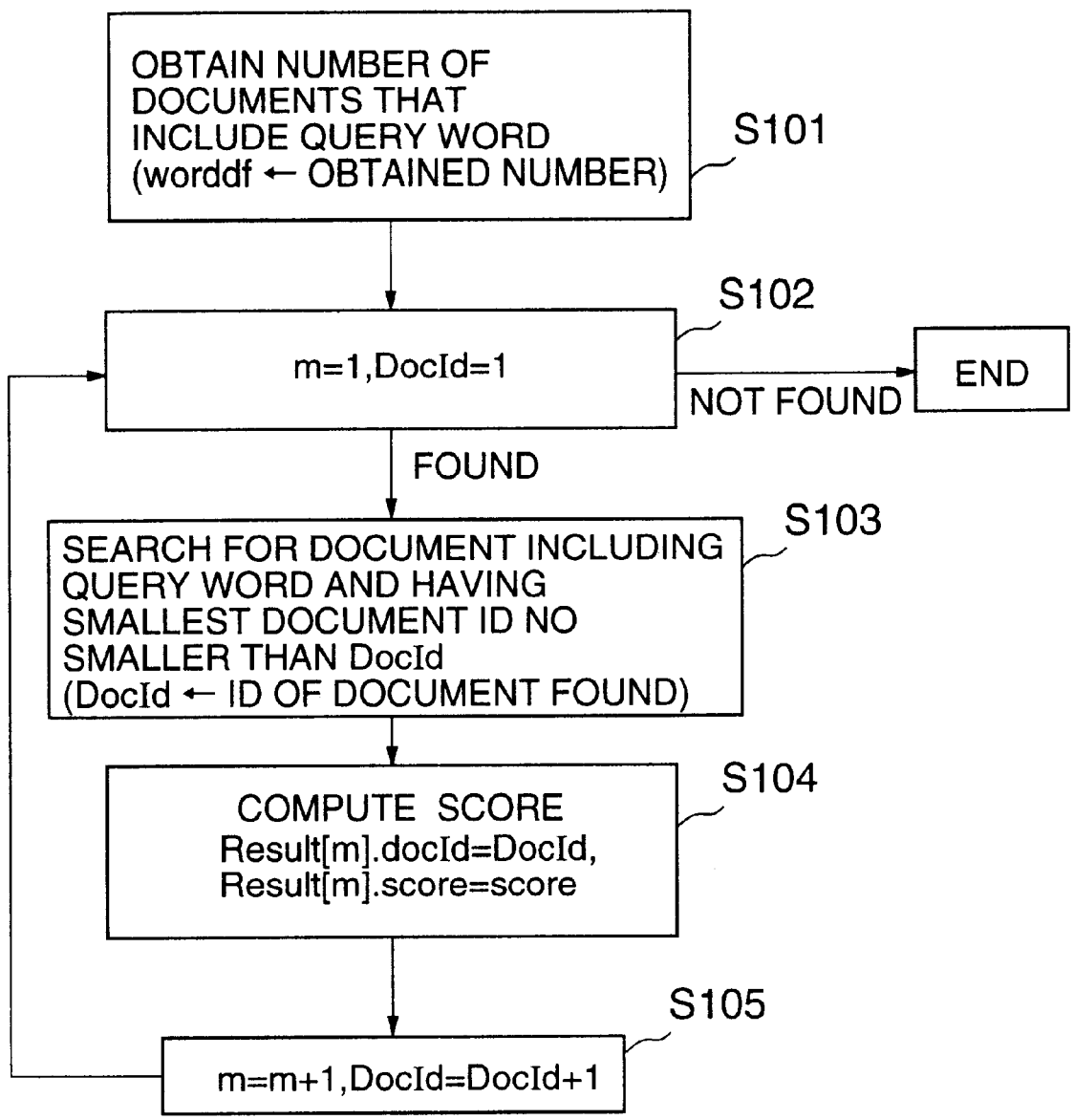
FIG. 9 is a flowchart of a process of computing ranking scores for a plurality of documents according to the fifth embodiment of the present invention.

FIG. 9 is a flowchart of a process of computing ranking scores for a plurality of documents according to the fifth embodiment of the present invention.

At a step S101 of FIG. 9, the number of documents that include the query character string is obtained. The obtained document count is set in a parameter worddf.

At a step S102, an array index m and a document identifier DocId are both set to 1.

At a step S103, a search is made for a document that includes the query character string and has the smallest document ID no smaller than DocId. If such a document is found, the document identifier DocId is set to the obtained document ID, and the procedure goes to a step S104. Otherwise, the procedure comes to an end.

At the step S104, a ranking score for the document having the document identifier DocId is computed. Here, the equation (1) used for computing a ranking score at the step S104 has df(str[n]) thereof being replaced by worddf. The obtained score is stored in the C-language-like structure having the document identifier and the score as its members.

At a step S105, the array index m and the document identifier DocId are each incremented by one. Then, the procedure goes back to the step S103.

According to the fifth embodiment of the present invention, influence of irrelevant occurrences of partial character strings is substantially eliminated from the ranking score of a query character string in respect of a selected document when the partial character strings appear out of context in the selected document or even appear out of context in other registered documents. This improves retrieval accuracy.

In this embodiment, the ranking scores of partial character strings are each equal to a ranking score that is obtained by using the number of documents having the query character string therein and the number of occurrences of the query character string. Because of this, there is no need to compute all the ranking scores of partial character strings and combine them with an aim of producing the ranking score of the query character string. Alternatively, the ranking score of the query character string is derived directly from the number of documents having the query character string therein and the number of occurrences of the query character string. This allows for reduction in the computation load, thereby achieving high-speed likely-relevance document retrieval.

In the following, a sixth embodiment of the present invention will be described.

In the sixth embodiment, the same elements as those of the fourth embodiment will be referred to by the same reference numerals, and a description thereof will be omitted.

The document-retrieval device 1 of the sixth embodiment differs from that of the fourth embodiment in the following aspects. In the fourth embodiment, an upper limit is placed on the number of occurrences of a query character string with an aim of boosting document-retrieval speed.

Placing a cap, however, may degrade retrieval accuracy since such a cap results in a different ranking score than that would be obtained without an upper limit. The extent to which the ranking score changes due to placing of an upper limit depends on the number of documents that include the query character string. When the equation (1) is used for computation of a ranking score, the fewer the number of documents that include the query character string, the larger the difference of the ranking score caused by placing of an upper limit. In consideration of this, it is preferable that the upper limit is dynamically changed according to the number of documents having the query character string therein with an aim of reducing an impact of placing a cap. For example, an upper limit $L_x$ for use in the case of the number of documents having a query character string therein being x (x 1) may be computed as:

$$L_x = L_1(1 + \log_2(N/x))/(1 + \log_2 N) \text{tm} \quad (2)$$

where $L_1$ is an upper limit used in the case of the number of documents having a query character string therein being 1. According to the equation (2), the fewer the number of documents having the query character string therein, the larger the upper limit is. That is, the fewer the number of documents having the query character string therein, the smaller the difference of the ranking score caused by the placing of the upper limit. In other words, reduction in retrieval accuracy due to introduction of an upper limit is ameliorated. It should be noted that the equation (2) is only an example, and any formulae may be used as long as an upper limit will increase with an increase in the number of documents having a query character string therein.

Figure 10:
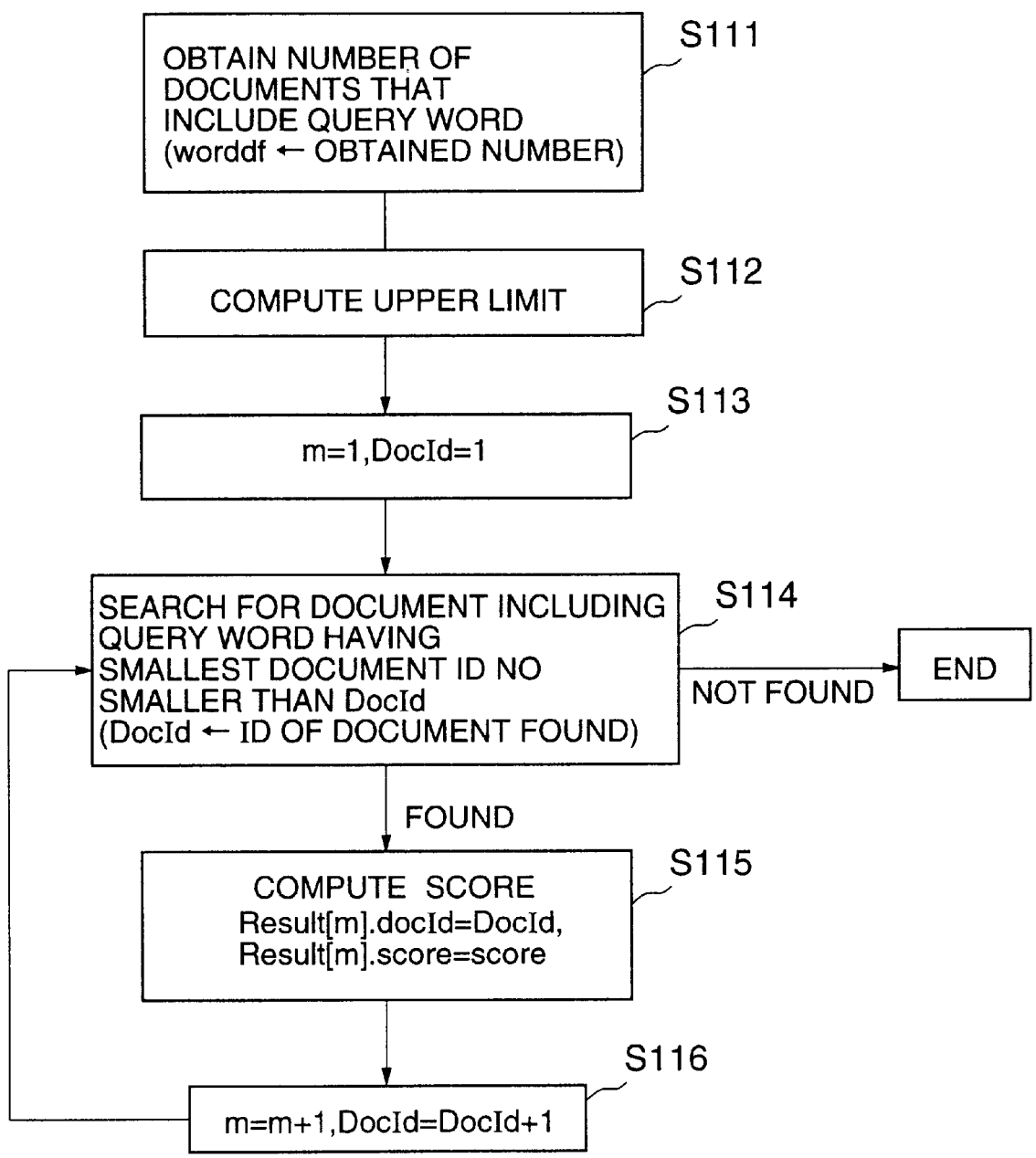
FIG. 10 is a flowchart of a process of computing ranking scores for a plurality of documents according to the sixth embodiment of the present invention.

FIG. 10 is a flowchart of a process of computing ranking scores for a plurality of documents according to the sixth embodiment of the present invention.

At a step S111 of FIG. 10, the number of documents that include the query character string is obtained. The obtained document count is set in a parameter worddf.

At a step S112, an upper limit $L_x$ is obtained by using the equation (2) in which worddf substitutes for x.

At a step S113, an array index m and a document identifier DocId are both set to 1.

At a step S114, a search is made for a document that includes the query character string and has the smallest document ID no smaller than DocId. If such a document is found, the document identifier DocId is set to the obtained document ID, and the procedure goes to a step S115. Otherwise, the procedure comes to an end.

At the step S115, a ranking score for the document having the document identifier DocId is computed. Here, the steps S11 through S15 of FIG. 7 are carried out at the step S115, with the equation of the step S13 having df(str[n]) thereof being replaced by worddf and having wordtf thereof being limited by the upper limit $L_x$.

At a step S116, the array index m and the document identifier DocId are each incremented by one. Then, the procedure goes back to the step S103.

In the following, a seventh embodiment of the present invention will be described.

In the seventh embodiment, the same elements as those of the first embodiment will be referred to by the same reference numerals, and a description thereof will be omitted.

The document-retrieval device 1 of the seventh embodiment differs from that of the first embodiment in the following aspects. In the first embodiment, when a query character string is shorter than a length (i.e., the number of characters) of a partial character string that serves as a unit of processing, the text-dividing unit 2 cannot divide the query character string into partial character strings, resulting in a situation where a document retrieval fails. For example, when a query character string is "A" and two characters constitute a unit of processing, no retrieval can be made since the query character string is shorter than the unit of processing.

When the query character string is shorter than a unit of processing, a procedure as follows will be used in the seventh embodiment of the present invention.

(1) The text-dividing unit 2 extracts all the partial character strings from the index unit 3 such that these partial character strings start with the same character(s) as does the query character string.

(2) The document-selection unit 4 identifies one or more documents that include at least one of the partial character strings extracted by the text-dividing unit 2.

(3) The score-computation unit 5 computes ranking scores of the documents selected by the document-selection unit 4 by using the partial character strings extracted by the text-dividing unit 2.

FIGS. 11A through 11C are illustrative drawings showing examples of documents and an example of a corresponding index unit. The above procedure will be described further in detail with reference to FIGS. 11A through 11C.

When a unit of processing is comprised of two characters, the index unit 3 will have the contents as shown in FIG. 11C with regard to the document of FIG. 11A and the document of FIG. 11B. Here, the data format of the index unit 3 shown in FIG. 11C is the same as that of the index unit 3 shown in FIG. 2C. In the following, the procedure of retrieval process will be described with reference to an example in which "Y" is given as a query character string.

The text-dividing unit 2 extracts three partial character strings "YI", "YK" and "YB" as partial character strings that have the same character at a start thereof as the query character string. The document-selection unit 4 selects the document of FIG. 11A and the document of FIG. 11B since they include at least one of the extracted partial character strings. Then, the score-computation unit 5 computes ranking scores of the selected documents by using the partial character strings extracted by the text-dividing unit 2.

When computing the ranking scores, the score-computation unit 5 derives a ranking score of the query character string in respect of a selected document from ranking scores of the partial character strings within the selected document. This is achieved, for example, by computing a sum of the ranking scores of the partial character strings. When the ranking scores of the partial character strings are computed based on the equation (1), one will obtain SCORE(YI)=0, SCORE(YK)=2, and SCORE(YB)=2, which produce SCORE(Y) that is equal to 4.

Figure 12:
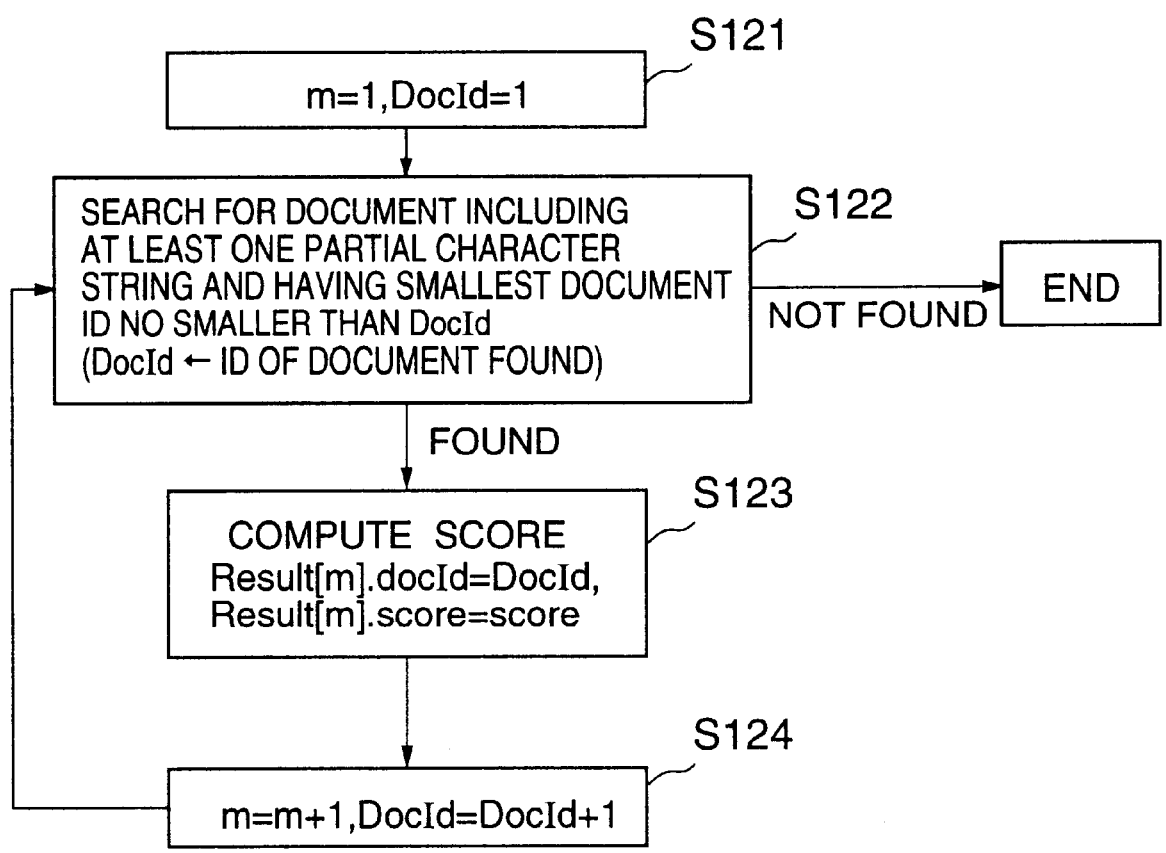
FIG. 12 is a flowchart of a process of computing ranking scores for a plurality of documents according to the seventh embodiment of the present invention.

FIG. 12 is a flowchart of a process of computing ranking scores for a plurality of documents according to the seventh embodiment of the present invention.

At a step S121, an array index m and a document identifier DocId are both set to 1.

At a step S122, a search is made for a document that includes at least one partial character string and has the smallest document ID no smaller than DocId. Here, the partial character strings are defined as those which start with the same character(s) as does the query character string. If such a document is found, the document identifier DocID is set to the obtained document ID, and the procedure goes to a step S123. Otherwise, the procedure comes to an end.

At the step S123, a ranking score for the document having the document identifier DocID is computed. The obtained score is stored in the C-language-like structure having the document identifier and the score as its members.

At a step S124, the array index m and the document identifier DocId are each incremented by one. Then, the procedure goes back to the step S122.

By following the procedure as described above, one can retrieve a document even when a query character string has a shorter length than a unit of processing.

In the computation of ranking scores, a document count that reflects the number of documents having a query character string therein may be used in the same manner as in the third embodiment of the present invention. In the example of FIGS. 11A and 11B, there are as many as two documents that include the character string "Y". With respect to the document of FIG. 11A, therefore, SCORE (YI)=0, SCORE(YK)=1, and SCORE(YB)=1 are obtained, resulting in SCORE(Y) being 2. This computation process can improve retrieval accuracy since it uses the number of documents having the query character string therein for the purpose of computing the ranking scores.

Further, the score-computation unit 5 may use the number of occurrences of the query character string in the document for the purpose of computing the ranking scores. In the document of FIG. 11A, the query character string "Y" appears twice as is calculated by adding up occurrence counts of "YI", "YK", and "YB" shown in FIG. 11C. Since the number of documents that include "Y" is two, SCORE (Y) is calculated as being 2. In this procedure, the equation (1) is computed a smaller number of times than is in the previous procedures, thereby achieving faster document retrieval.

In the following, an eighth embodiment of the present invention will be described.

Figure 13:
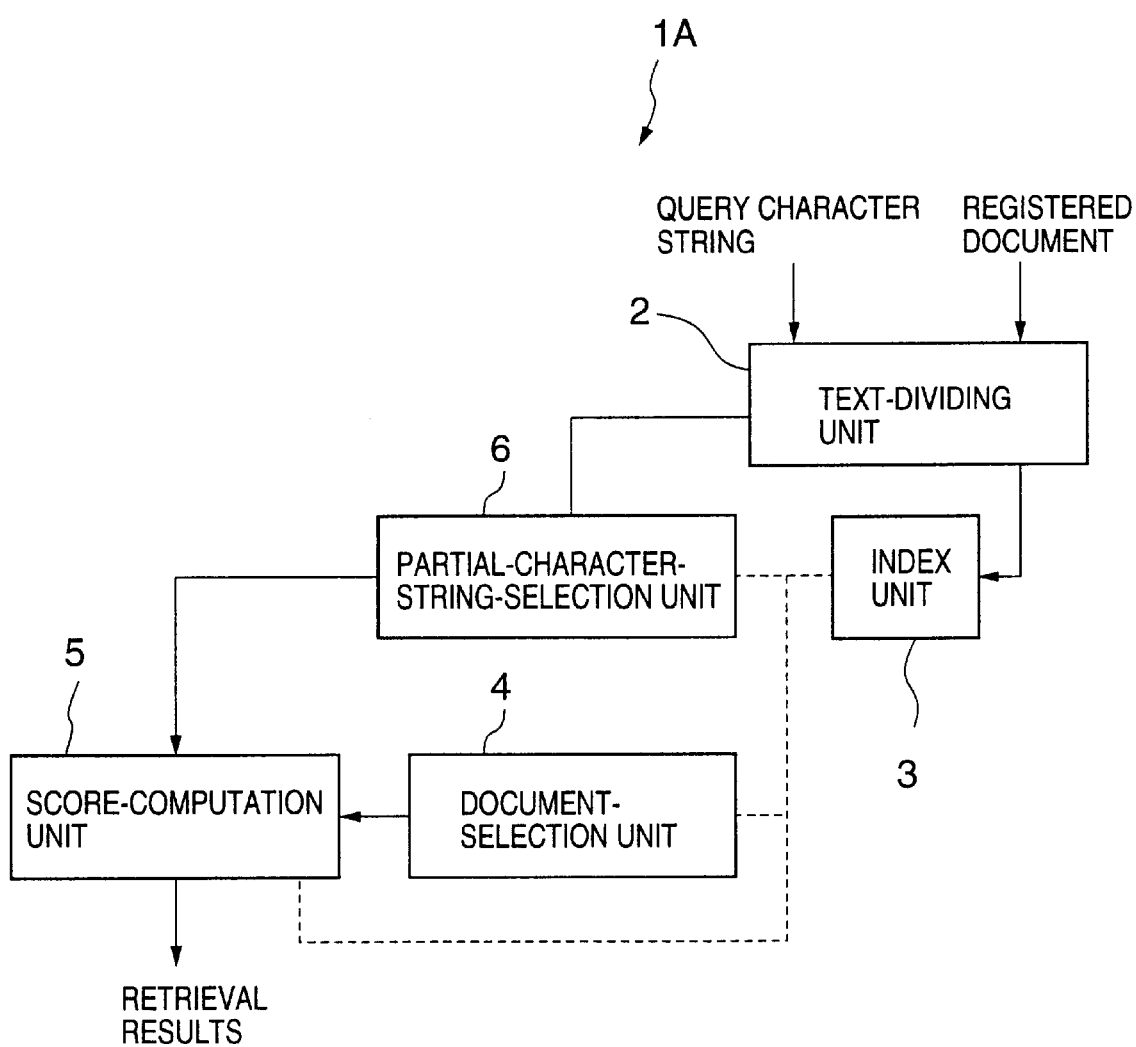
FIG. 13 is a block diagram of the document-retrieval device according to the eighth embodiment of the present invention.

FIG. 13 is a block diagram of the document-retrieval device 1A according to an eighth embodiment of the present invention.

The text-dividing unit 2 divides a text into partial character strings where the text may be a registered document or may be a query character string. The index unit 3 stores therein information about partial character strings that are obtained by dividing a registered document. A partial-character-string-selection unit 6 selects partial character strings that are to be used for document-retrieval purposes where such selection is made from the partial character strings obtained by dividing the query character string. The document-selection unit 4 uses the partial character strings selected by the partial-character-string-selection unit 6 to select a document for which a ranking score is to be calculated. The score-computation unit 5 uses the partial character strings selected by the partial-character-string-selection unit 6 to compute a ranking score of the document selected by the document-selection unit 4. The text-dividing unit 2 performs a dividing step, and the document-selection unit 4 carries out a document-selection step. Further, the score-computation unit 5 performs a score-computation step, and the partial-character-string-selection unit 6 carries out a partial-character-string-selection step.

Registration of documents is the same as in the first embodiment.

When a query character string is provided for the purpose of document retrieval, the text-dividing unit 2 divides the query character string into partial character strings. The partial-character-string-selection unit 6 selects partial character strings from all the partial character strings that are obtained by dividing the query character string, so that the selected partial character strings are to be used for document-retrieval purposes. The document-selection unit 4 selects a document or documents for which a ranking score is to be computed where such selection is made in view of the selected partial character strings. The score-computation unit 5 computes a ranking score for each of the selected documents by using the selected partial character strings, thereby providing document-retrieval results.

The text-dividing unit 2, the document-selection unit 4, and the score-computation unit 5 function much in the same manner as in the first embodiment. The partial-character-string-selection unit 6 selects partial character strings as few as possible yet enough to cover the full length of the query character string where such selection is made from all the partial character strings obtained by the text-dividing unit 2 dividing the query character string. In order to select the partial character strings no more than is necessary to cover the full length of the query character string, the partial-character-string-selection unit 6 selects partial character strings one after another from the beginning of the query character string such that they do not overlap each other. If the partial character strings that are selected so as not to overlap each other cannot cover the full length of the query character string, a partial character string corresponding to an end portion of the query character string is additionally selected.

When a query character string "ABCDEF" is provided, for example, the text-dividing unit 2 extracts five partial character strings "AB", "BC", "CD", "DE", and "EF". In this case, the partial-character-string-selection unit 6 selects three of the five strings "AB", "CD", and "EF" while dismissing the other two strings "BC" and "DE". When a query character string is "BCDEF", on the other hand, two partial character strings "BC" and "DE" are selected first. No more partial character string can be selected without overlapping, yet the selected two partial character strings fail to cover the full length of the query character string (i.e., cannot cover the last character of the query character string). In this case, another partial character string "EF" is additionally selected. As a result, the three partial character strings "BC", "DE", and "EF" are selected from the query character string "BCDEF".

Selected partial character strings are always fewer than all the partial character strings. When a query character string is comprised of m characters, the number of selected partial character strings is equal to the smallest integer no smaller than m/n. Namely, if n is 2 and m is 3, the smallest integer no smaller than 3/2 is 2. If n is 2 and m is 4, the smallest integer no smaller than 4/2 is 2. If n is 2 and m is 5, the smallest integer no smaller than 5/2 is 3. This number of selected partial character strings is smaller than (m−n+1) that is the number of partial character strings used in Japanese Patent Laid-open Application No.11-85776. In this manner, the eighth embodiment of the present invention can reduce the computation load of selecting documents and calculating ranking scores, thereby achieving high-speed document retrieval.

FIG. 14 is a flowchart of a process of selecting partial character strings that do not overlap and cover the full length of a query character string.

At a step S201, a parameter s is set to 1.

This parameter indicates a start position of a partial character string.

At a step S202, s plus sublen is calculated, and the resulting sum is set in a parameter e. Here, sublen is a length of partial character strings, i.e., a length of a unit of processing. The parameter e indicates a position next following an end position of the partial character string starting at the position s.

At a step S203, a check is made as to whether e is greater than len plus 1 where len is the length of the query character string. If it is not, the procedure goes to a step S204.

At the step S204, a partial character string having the start position s is selected as one of the retrieval-purpose partial character strings.

At a step S205, a check is made as to whether e is equal to len plus 1. If it is, the procedure comes to an end.

At a step S206, the start position s is set to e. Then, the procedure goes back to the step S202.

If the check at the step S203 finds that e is greater than len plus 1, the procedure goes to a step S207.

At the step S207, a partial character string having a start position (len−sublen+1) is selected as one of the retrieval-purpose partial character strings. Then, the procedure comes to an end.

It should be noted that the eighth embodiment of the present invention may be modified in the same manner as the first embodiment was modified to provide the second through seventh embodiment as previously described.

It should be as well noted that although the first through eighth embodiments have been described with reference to a particular combination of features of the present invention, various other combinations may be made to provide variations of the respective embodiments.

Further, the present invention is not limited to these embodiments, but various variations and modifications may be made without departing from the scope of the present invention.

The present application is based on Japanese priority application No. 11-360369 filed on Dec. 20, 1999, with the Japanese Patent Office, the entire contents of which are hereby incorporated by reference.

What is claimed is:

1. A method for document retrieval, comprising:
    dividing a query character string into partial character strings;
    selecting at least one document from a plurality of registered documents such that each of the at least one document includes all the partial character strings;
    computing respective scores of the partial character strings for each of the at least one document; and
    computing a score of the query character string from the respective scores of the partial character strings for each of the at least one document.

2. The method as claimed in claim 1, wherein said dividing step comprises dividing the query character string into the partial character strings such that each pair of adjacent partial character strings includes a same character.

3. The method as claimed in claim 1, wherein said dividing step comprises dividing the query character string into the partial character strings such that at most one pair of adjacent partial character strings includes a same character, and together the partial character strings cover a full length of the query character string.

4. The method as claimed in claim 1, wherein said step of computing respective scores of the partial character strings comprises:
    obtaining a first count indicating how many of the plurality of registered documents include a given one of the partial character strings;
    obtaining a second count indicating how many times the given one of the partial character strings appears in a given one of the at least one document; and
    obtaining a score of the given one of the partial character strings for the given one of the at least one document from the first count and the second count, such that the score of the given one of the partial character strings increases as the first count decreases and as the second count increases.

5. The method as claimed in claim 1, wherein said step of computing respective scores of the partial character strings comprises:
    obtaining a first count indicating how many of the plurality of registered documents include a given one of the partial character strings;
    obtaining second counts each indicating how many times a corresponding one of the partial character strings appears in a given one of the at least one document;
    obtaining a smallest of the second counts; and
    obtaining a score of the given one of the partial character strings for the given one of the at least one document from the first count and the smallest of the second counts such that the score of the given one of the partial character strings increases as the first count decreases and as the smallest of the second counts increases.

6. The method as claimed in claim 1, wherein said step of computing respective scores of the partial character strings comprises:
    obtaining a first count indicating how many of the plurality of registered documents include a given one of the partial character strings;
    obtaining a second count indicating how many times the query character string appears in a given one of the at least one document; and
    obtaining a score of the given one of the partial character strings for the given one of the at least one document from the first count and the second count such that the score of the given one of the partial character strings increases as the first count decreases and as the second count increases.

7. The method as claimed in claim 6, wherein said step of obtaining a second count further comprises placing an upper limit on the second count.

8. The method as claimed in claim 1, wherein said step of selecting the at least one document selects the at least one document, each of which includes the query character string, and said step of computing respective scores of the partial character strings comprises:
    obtaining a first count indicating how many of the plurality of registered documents include the query character string;
    obtaining a second count indicating how many times a given one of the partial character strings appears in a given one of the at least one document; and
    obtaining a score of the given one of the partial character strings for the given one of the at least one document from the first count and the second count such that the score of the given one of the partial character strings increases as the first count decreases and as the second count increases.

9. The method as claimed in claim 1, wherein said step of selecting the at least one document selects the at least one document, each of which includes the query character string, and said step of computing respective scores of the partial character strings comprises:

obtaining a first count indicating how many of the plurality of registered document include the query character string;

computing a limit from the first count;

obtaining a second count indicating how many times the query character string appears in a given one of the at least one document while limiting an upper end of the second count to said limit; and obtaining a score of a given one of the partial character strings for the given one of the at least one document from the first count and the second count such that the spore of the given one of the partial character strings increases as the first count decreases and as the second count increases.

10. A method for document retrieval, comprising the steps of:

providing respective indexes for documents, each of the respective indexes listing partial character strings found in a corresponding document and respective positions thereof in the corresponding document;

selecting the partial character strings which start with a character string identical to a query character string;

selecting at least one document from the documents such that the at least one document each includes at least one of the selected partial character strings;

computing respective scores of the selected partial character strings for each of the at least one document; and computing a score of the query character string from the respective scores of the selected partial character strings for each of the at least one document.

11. The method as claimed in claim 10, wherein said step of computing respective scores of the selected partial character strings includes the steps of:

obtaining a first count indicating how many of the registered documents include a given one of the selected partial character strings;

obtaining a second count indicating how many times the given one of the selected partial character strings appears in a given one of the at least one document; and obtaining a score of the given one of the selected partial character strings for the given one of the at least one document from the first count and the second count such that the score of the given one of the selected partial character strings increases as the first count decreases and as the second count increases.

12. The method as claimed in claim 10, wherein said step of computing respective scores of the selected partial character strings comprises:

obtaining a first count indicating how many of the registered documents include a given one of the selected partial character strings;

obtaining a second count indicating how many times the query character string appears in a given one of the at least one document; and obtaining a score of the given one of the selected partial character strings for the given one of the one at least document from the first count and the second count such that the score of the given one of the selected partial character strings increases as the first count decreases and as the second count increases.

13. A device for document retrieval, comprising:

a dividing unit which divides a query character string into partial character strings;

a document-selection unit which selects at least one document from a plurality of registered documents such that the at least one document each include all the partial character strings; and a score-computation unit which computes respective scores of the partial character strings for each of the at least one document, and further computes a score of the query character string from the respective scores of the partial character strings for each of the at least one document.

14. The device as claimed in claim 13, wherein said dividing unit divides the query character string into the partial character strings such that each pair of adjacent partial character strings includes a same character.

15. The device as claimed in claim 14, further comprising a partial-character-string-selection unit which selects the partial character strings that generally do not include a same character and that together cover a full length of the query character string, the selected partial character strings being subsequently used to compute respective scores of the selected partial character strings.

16. The device as claimed in claim 13, wherein said score-computation unit computes comprises:

means for obtaining a first count indicating how many of the registered documents include a given one of the partial character strings;

means for obtaining a second count indicating how many times the given one of the partial character strings appears in a given one of the at least one document; and means for obtaining a score of the given one of the partial character strings for the given one of the at least one document from the first count and the second count such that the score of the given one of the partial character strings increases as the first count decreases and as the second count increases.

17. The device as claimed in claim 13, wherein said score-computation unit comprises:

means for obtaining a first count indicating how many of the registered documents include a given one of the partial character strings;

means for obtaining second counts each indicating how many times a corresponding one of the partial character strings appears in a given one of the at least one document;

means for obtaining a smallest of the second counts; and means for obtaining a score of the given one of the partial character strings for the given one of the at least one document from the first count and the smallest of the second counts such that the score of the given one of the partial character strings increases as the first count decreases and as the smallest of the second counts increases.

18. The device as claimed in claim 13, wherein said score-computation unit comprises:

means for obtaining a first count indicating how many of the registered documents include a given one of the partial character strings;

means for obtaining a second count indicating how many times the query character string appears in a given one of the at least one document; and means for obtaining a score of the given one of the partial character strings for the given one of the at least one document from the first count and the second count such that the score of the given one of the partial character strings increases as the first count decreases and as the second count increases.

19. The device as claimed in claim 18, wherein said means for obtaining a second count further comprises means for placing an upper limit on the second count.

20. The device as claimed in claim 13, wherein said document-selection unit selects the at least one document each of which includes the query character string, and said score-computation unit comprises:

means for obtaining a first count indicating how many of the registered documents include the query character string;

means for obtaining a second count indicating how many times a given one of the partial character strings appears in a given one of the at least one document; and means for obtaining a score of the given one of the partial character strings for the given one of the at least one document from the first count and the second count such that the score of the given one of the partial character strings increases as the first count decreases and as the second count increases.

21. The device as claimed in claim 13, wherein said document-selection unit selects the at least one document each of which includes the query character string, and said score-computation unit comprises:

means for obtaining a first count indicating how many of the registered documents include the query character string;

means for computing a limit from the first count;

means for obtaining a second count indicating how many times the query character string appears in a given one of the at least one document while limiting an upper end of the second count to said limit; and means for obtaining a score of a given one of the partial character strings for the given one of the at least one document from the first count and the second count such that the score of the given one of the partial character strings increases as the first count decreases and as the second count increases.

22. A device for document retrieval, comprising:

a text-dividing unit which provides respective indexes for documents, each of the respective indexes listing partial character strings found in a corresponding document and respective positions thereof in the corresponding document, and which selects the partial character strings which start with a character string identical to a query character string;

a document-selection unit which selects at least one document from the documents such that the at least one document each include at least one of the selected partial character strings; and a score-computation unit which computes respective scores of the selected partial character strings for each of the at least one document, and further computes a score of the query character string from the respective scores of the selected partial character strings for each of the at least one document.

23. The device as claimed in claim 22, wherein said score-computation unit comprises:

means for obtaining a first count indicating how many of the registered documents include a given one of the selected partial character strings;

means for obtaining a second count indicating how many times the given one of the selected partial character strings appears in a given one of the at least one document; and means for obtaining a score of the given one of the selected partial character strings for the given one of the at least one document from the first count and the second count such that the score of the given one of the selected partial character strings increases as the first count decreases and as the second count increases.

24. The device as claimed in claim 22, wherein said score-computation unit comprises:

means for obtaining a first count indicating how many of the registered documents include a given one of the selected partial character strings;

means for obtaining a second count indicating how many times the query character string appears in a given one of the at least one document; and means for obtaining a score of the given one of the selected partial character strings for the given one of the at least one document from the first count and the second count such that the score of the given one of the selected partial character strings increases as the first count decreases and as the second count increases.

25. A computer-readable record medium having a program embodied therein for causing a computer to attend to document retrieval, said program comprising:

a dividing code unit which divides a query character string into partial character strings;

a document-selection code unit which selects at least one document from a plurality of registered documents such that the at least one document each include all the partial character strings; and a score-computation code unit which computes respective scores of the partial character strings for each of the at least one document, and further computes a score of the query character string from the respective scores of the partial character strings for each of the at least one document.

26. The computer-readable record medium as claimed in claim 25, wherein said dividing code unit divides the query character string into the partial character strings such that each pair of adjacent partial character strings includes a same character.

27. The computer-readable record medium as claimed in claim 26, wherein said program further comprises a partial-character-string-selection code unit which selects the partial character strings that generally do not include a same character and that together cover a full length of the query character string, the selected partial character strings being subsequently used to compute respective scores of the selected partial character strings.

28. The computer-readable record medium as claimed in claim 25, wherein said score-computation code unit computes comprises:

code means for obtaining a first count indicating how many of the registered documents include a given one of the partial character strings;

code means for obtaining a second count indicating how many times the given one of the partial character strings appears in a given one of the at least one document; and code means for obtaining a score of the given one of the partial character strings for the given one of the at least one document from the first count and the second count such that the score of the given one of the partial character strings increases as the first count decreases and as the second count increases.

29. The computer-readable record medium as claimed in claim 25, wherein said score-computation code unit comprises:

code means for obtaining a first count indicating how many of the registered documents include a given one of the partial character strings;

code means for obtaining second counts each indicating how many times a corresponding one of the partial character strings appears in a given one of the at least one document;

code means for obtaining a smallest of the second counts; and code means for obtaining a score of the given one of the partial character strings for the given one of the at least one document from the first count and the smallest of the second counts such that the score of the given one of the partial character strings increases as the first count decreases and as the smallest of the second counts increases.

30. The computer-readable record medium as claimed in claim 25, wherein said score-computation code unit comprises:

code means for obtaining a first count indicating how many of the registered documents include a given one of the partial character strings;

code means for obtaining a second count indicating how many times the query character string appears in a given one of the at least one document; and code means for obtaining a score of the given one of the partial character strings for the given one of the at least one document from the first count and the second count such that the score of the given one of the partial character strings increases as the first count decreases and as the second count increases.

31. The computer-readable record medium as claimed in claim 30, wherein said code means for obtaining a second count further comprises code means for placing an upper limit on the second count.

32. The device as claimed in claim 25, wherein said document-selection code unit selects the one or more documents each of which includes the query character string, and said score-computation code unit comprises:

code means for obtaining a first count indicating how many of the registered documents include the query character string;

code means for obtaining a second count indicating how many times a given one of the partial character strings appears in a given one of the at least one document; and code means for obtaining a score of the given one of the partial character strings for the given one of the at least one document from the first count and the second count such that the score of the given one of the partial character strings increases as the first count decreases and as the second count increases.

33. The computer-readable record medium as claimed in claim 25, wherein said document-selection code unit selects the one or more documents each of which includes the query character string, and said score-computation code unit comprises:

code means for obtaining a first count indicating how many of the registered documents include the query character string;

code means for computing a limit from the first count;

code means for obtaining a second count indicating how many times the query character string appears in a given one of the at least one document while limiting an upper end of the second count to said limit; and code means for obtaining a score of a given one of the partial character strings for the given one of the at least one document from the first count and the second count such that the score of the given one of the partial character strings increases as the first count decreases and as the second count increases.

34. A computer-readable record medium having a program embodied therein for causing a computer to attend to document retrieval, said program comprising:

a text-dividing code unit which provides respective indexes for documents, each of the respective indexes listing partial character strings found in a corresponding document and respective positions-thereof in the corresponding document, and which selects the partial character strings which start with a character string identical to a query character string;

a document-selection code unit which selects one or more documents from the documents such that the at least one document each include at least one of the selected partial character strings; and a score-computation code unit which computes respective scores of the selected partial character strings for each of the at least one document, and further computes a score of the query character string from the respective scores of the selected partial character strings for each of the at least one document.

35. The computer-readable record medium as claimed in claim 34, wherein said score-computation code unit comprises:

code means for obtaining a first count indicating how many of the registered documents include a given one of the selected partial character strings;

code means for obtaining a second count indicating how many times the given one of the selected partial character strings appears in a given one of the at least one document; and code means for obtaining a score of the given one of the selected partial character strings for the given one of the at least one document from the first count and the second count such that the score of the given one of the selected partial character strings increases as the first count decreases and as the second count increases.

36. The computer-readable record medium as claimed in claim 34, wherein said score-computation code unit comprises:

code means for obtaining a first count indicating how many of the registered documents include a given one of the selected partial character strings;

code means for obtaining a second count indicating how many times the query character string appears in a given one of the at least one document; and code means for obtaining a score of the given one of the selected partial character strings for the given one of the at least one document from the first count and the second count such that the score of the given one of the selected partial character strings increases as the first count decreases and as the second count increases.

* * * * *